Sept. 11, 1951 W. F. CRONIN 2,567,552
DATA CARD SENSING DEVICE
Filed Dec. 23, 1950

INVENTOR.
WILLIAM F. CRONIN
BY
Ralph E. Bitner
ATTORNEY

Patented Sept. 11, 1951

2,567,552

UNITED STATES PATENT OFFICE 2,567,552

DATA CARD SENSING DEVICE

William F. Cronin, Rye, N. Y., assignor to Remington Rand Inc., New York, N. Y., a corporation of Delaware Application December 23, 1950, Serial No. 202,455

8 Claims. (Cl. 235—61.11)

This invention relates to a sensing device for punched data cards, and has particular reference to the construction and operation of a sensing system which senses the card by producing sound energy of very high frequency on one side of a punched data card and then detecting the presence of this high frequency radiation on the opposite side of the card.

Punched data cards have been used for many years in the accounting and business field for the storage of records. Characters are placed in the data cards by means of small holes which conform to a predetermined code and represent either a number or a letter. Various means have been devised and used for sensing the punched cards, some of which include mechanical pin sensing, electric sensing by means of brushes, and light sensing by means of photoelectric cells. Each of these methods has certain drawbacks and disadvantages. The mechanical system causes a certain amount of wear and tear on the card. The electric sensing by means of brushes operates only by making and breaking a circuit, and a small amount of dust or lint under the brush causes an error. Also, for electric sensing the data cards must be carefully selected to insure that they themselves do not contain conductive areas. Light sensing by means of photoelectric cells produces no wear and tear on the cards, and does not depend upon the insulation characteristics of the card material, but the photoelectric cells used in present day machines produce a very small amount of current when actuated, and the cells themselves may become inoperative at any time without giving any visual indication.

The method herein described avoids the above mentioned disadvantages. A vacuum tube oscillator supplies a piezoelectric crystal to generate sound energy having a frequency which is above the range of human audibility having frequencies generally above 16,000 cycles per second. Sound waves of this frequency have characteristics which are quite different from the lower frequency sound waves within the range of audibility. High frequency or ultrasonic waves travel in straight lines only, similar to a beam of light. Sound waves of this type may be received by a similar piezoelectric crystal and the sound waves may thereby be transformed directly into electric current.

One of the objects of the invention is to provide an improved sensing means for punched data cards which avoids one or more of the disadvantages and limitations of prior art arrangements.

Another object of the invention is to increase the speed of card sensing.

Another object of the invention is to produce a sensing structure which will not produce any noise capable of being heard by human beings.

Another object of the invention is to provide a card sensing mechanism which is dependable in action, and consumes very little power for its operation.

The invention includes a sensing chamber which senses the holes in data cards by means of an ultrasonic source and a receiving transducer having similar frequency characteristics. A high frequency vacuum tube oscillator is employed to supply power to the ultrasonic generator which is positioned on one side of the sensing chamber in alignment with a hole position in a data card. On the other side of the sensing chamber a sound receiver is mounted which changes the sound vibrations into electric oscillations of the same frequency. This electric current is applied to another vacuum tube amplifier circuit, and the output of this amplifier may be applied to any load circuit useful in the accounting and tabulating machine field.

For a better understanding of the present invention, together with other and further objects thereof, reference is made to the following description taken in connection with the accompanying drawings.

Figure 1:
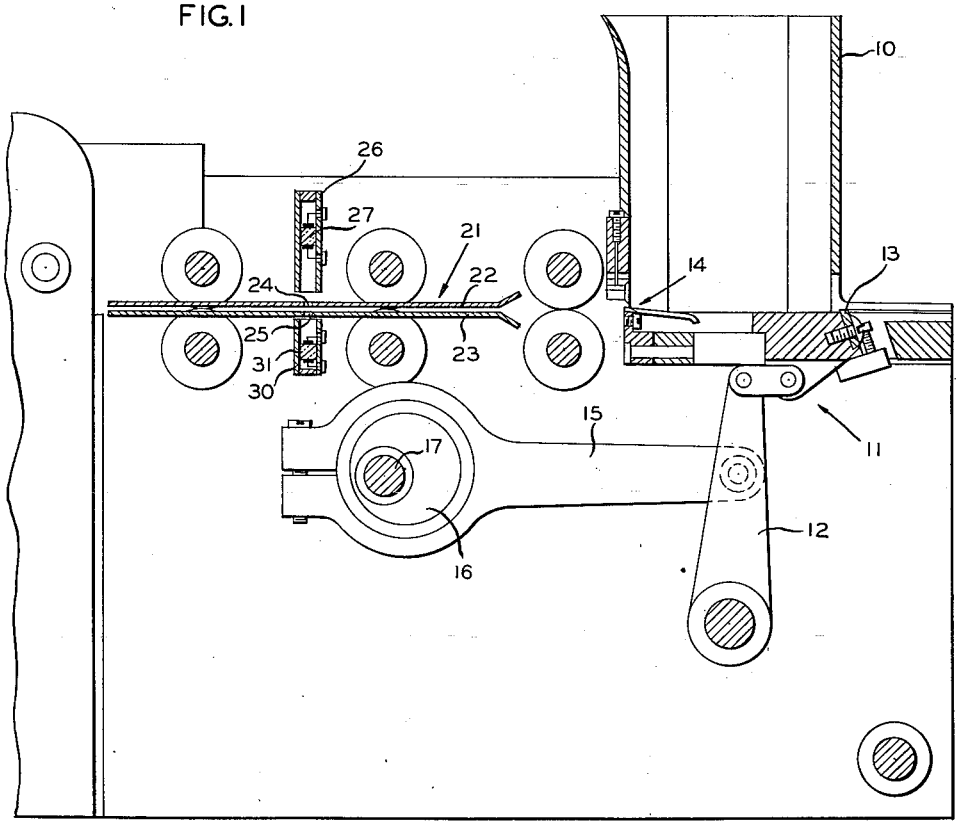
Fig. 1 is a sectional view taken through the central part of a card feeding and sensing mechanism, and shows the sound generating crystal on one side of a sensing chamber and a sound receiving transducer on the other side.

Referring now to Fig. 1, a card hopper 10, adapted to receive a pack of data cards, is positioned above a card feeding means 11 which includes a reciprocating lever 12, a picker knife 13, and a card throat 14. The lever 12 is operated by a horizontal driving rod 15 which, in turn, receives its motion from an eccentric 16 driven by a shaft 17 which is connected to the main motor drive shaft. This card feeding means is similar in construction to that described in U. S. patent to James Powers, No. 1,282,626, issued October 22, 1918.

Two power driven rollers 20 are mounted adjacent to the card throat 14 and engage the card soon after it is fed from the stack. The rollers propel the card into a sensing chamber 21, which consists of a top plate 22 and a bottom plate 23. The plates are provided with sensing holes, such as the combination 24—25, which are located at points which will align with data holes in the card as it passes through the chamber.

There may be any number of sensing holes in the chamber, and each may be used to sense the presence of a data hole. However, for the present description, let it be assumed that a single row of sensing holes is employed for a sorting operation. Above the hole 24 a tubular casing 26 is secured, open at the bottom but closed at the top. A transducer 27 is mounted within the casing, spaced a predetermined distance from the lower opening. This transducer 27 may be any one of the well known piezoelectric units, such as quartz, Rochelle salt, or barium titanate, and is arranged with the usual conductive coatings on opposite sides of the crystal. Electric terminals are provided on the tubular casing for a connection to an oscillator which delivers alternating electrical energy at about 200,000 cycles per second. Frequencies suitable for such an application lie within the range of 16,000 to 200,000 cycles per second.

Directly opposite the casing 26 and positioned under the lower sensing plate 23 is a second casing 30 which holds a receiving crystal 31. Crystal 31 is provided with electrical conductive coatings and terminals similar to transmitting crystal 27. The receiving crystal 31 transforms the sound waves transmitted by crystal 27 and converts them into electrical vibrations of the same frequency. In order to increase the efficiency of transmittal between crystals, the dimensions of the tubular casings 26 and 30 can be made to produce resonance at the frequency used. However, this is not necessary and non-resonant operation has been found to be quite satisfactory.

When a data card is passing through the sensing chamber and no holes are in alignment with holes 24 or 25, the sound transmitted from crystal 27 is, for all practical purposes, cut off and none will be received by the receiving crystal 31. When a data hole passes the sensing position, in alignment with holes 24 and 25, sound waves from crystal 27 pass through the holes to the receiving crystal 31 and produce an electrical signal which may be amplified and utilized in a load circuit.

Figure 2:
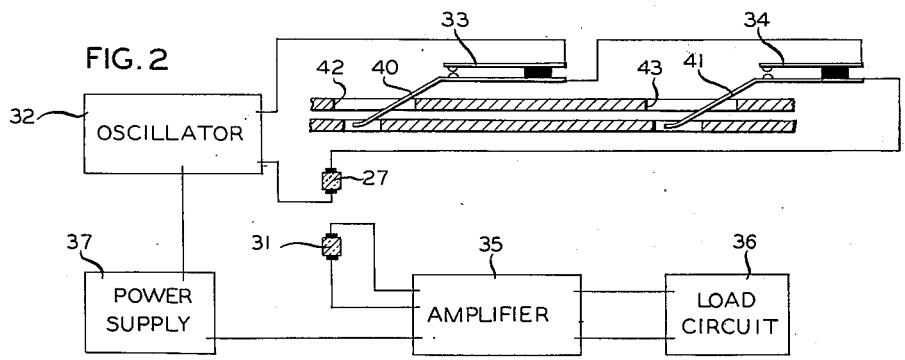
Fig. 2 is a schematic diagram of connections in block form, including two card switches for sensing the presence of a card in the chamber, and indicating in a general manner how this form of sensing may be utilized.

In Fig. 2, the schematic diagram of electrical connections, the transmitting crystal 27 is shown connected to an oscillator 32 in series with two card switches 33 and 34. The receiving crystal 31 is connected directly to the input terminals of an amplifier 35 and the output of the amplifier is connected to a load circuit 36. A power supply 37, of well known design, is used to supply both the oscillator 32 and amplifier 35 with the necessary electrical voltages for their operation.

Switches 33 and 34 are connected in series arrangement with the oscillator 32 and the transmitting crystal 27 so that no sound will be generated unless both switches are closed. Each switch includes an extension 40, 41, made of light flexible material, which extends through a hole 42, 43, in the top plate 22 of the sensing chamber, and is arranged to close the switch contacts whenever a data card moves by the switch position. For a simple single hole sensing operation, the switch extensions 40, 41, are adjusted to be slightly less than the width of a card apart and at such a position relative to the crystals that double contact is made and the transmitting crystal energized only when a desired hole position traverses the path of the sound energy. In this manner, a determination is made whether or not a hole is present in a data card at a predetermined position. Before and after a card is being sensed causes no sound signal because one or both the switches 33, 34, are open and the transmitting crystal receives no energizing voltage.

It will be obvious that the switches 33, 34, may be connected in series with the receiving crystal and the amplifier or the switches may be used in the power supply circuit. The requirement for successful operation resides in a completed circuit when a desired hole position passes the crystals and an open circuit at all other times.

The load circuit 36 may be any utilization circuit used in the tabulating machine art, and may include solenoids for operating sorter gates, relays for transferring indicia to a printing mechanism, or magnets for controlling punch interponents.

While it is of particular advantage to sense the data cards while in motion, they may be stopped by the usual card stop mechanism and sensed while held in the sensing chamber.

While there have been described and illustrated specific embodiments of the invention, it will be obvious that various changes and modifications may be made therein without departing from the field of the invention which should be limited only by the scope of the appended claims.

What is claimed is:

1. A sensing mechanism for sensing punched data cards comprising, a transmitting transducer positioned on one side of a data card when said card is in a sensing position, the transmitting transducer adapted to produce sound energy when energized by a source of electrical power, a receiving transducer positioned on the opposite side of the card and adapted to transform sound energy into electrical power, and a translating circuit connected to the receiving transducer for supplying a signal to a load circuit.

2. A sensing mechanism for sensing punched data cards comprising, a sensing chamber for supporting a data card in a sensing position, a transmitting transducer positioned on one side of the sensing chamber for supplying sound energy when energized by a source of electrical power, a receiving transducer positioned on the other side of the sensing chamber for transforming received sound energy into electrical power, and a translating circuit connected to the receiving transducer for supplying a signal to a load circuit.

3. A sensing mechanism for sensing punched data cards comprising, a sensing chamber for supporting a data card in a sensing position, a piezoelectric transmitting transducer positioned on one side of the sensing chamber for supplying sound energy when energized by a source of electrical power, a piezoelectric receiving transducer positioned on the other side of the sensing chamber for transforming received sound energy into electrical power, and a translating circuit connected to the receiving transducer for supplying a signal to a load circuit.

4. A sensing mechanism for sensing punched data cards comprising, a sensing chamber for supporting a data card in a sensing position, a piezoelectric transmitting transducer positioned on one side of the sensing chamber for supplying sound energy when energized by a source of electrical power, a piezoelectric receiving transducer positioned on the other side of the sensing chamber and in alignment with the transmitting transducer for transforming received sound energy into electrical power, and a translating circuit connected to the receiving transducer for supplying a signal to a load circuit.

5. A sensing mechanism for sensing the data in punched cards comprising, a sensing chamber for supporting a data card in a sensing position, a piezoelectric transmitting transducer positioned on one side of the sensing chamber for supplying sound energy when energized by a source of electric power, a piezoelectric receiving transducer positioned on the other side of the sensing chamber and in alignment with the transmitting transducer for receiving sound energy through a data hole in the card and transforming said energy into electrical power, and a translating circuit connected to the receiving transducer for supplying a signal to a load circuit when a data hole is sensed.

6. A sensing mechanism for sensing the data in punched cards comprising, a sensing chamber for supporting a data card in a sensing position, a piezoelectric transmitting transducer enclosed in a shielded compartment and positioned on one side of the sensing chamber for supplying sound energy when energized by a source of electric power, a piezoelectric receiving transducer also enclosed in a shielded compartment positioned on the other side of the sensing chamber and in alignment with the transmitting transducer for receiving sound energy through a data hole in the card and transforming said energy into electrical power, and a translating circuit connected to the receiving transducer for supplying a signal to a load circuit when a data hole is sensed.

7. A sensing mechanism for sensing the data in punched cards comprising, a sensing chamber for supporting a data card in a sensing position, a piezoelectric transmitting transducer enclosed in a shielded compartment and positioned on one side of the sensing chamber for supplying sound energy when energized by a source of electric power, a piezoelectric receiving transducer also enclosed in a shielded compartment positioned on the other side of the sensing chamber and in alignment with the transmitting transducer for receiving sound energy through a data hole in the card and transforming said energy into electrical power, a translating circuit connected to the receiving transducer for supplying a signal to a load circuit when a data hole is sensed, and switching means in series with the transmitting transducer for disabling the generation of sound energy except at the time when the data card is in a predetermined sensing position.

8. A sensing mechanism for sensing the data in punched cards comprising, a sensing chamber for supporting a data card in a sensing position, a piezoelectric transmitting transducer enclosed in a shielded compartment and positioned on one side of the sensing chamber for supplying sound energy when energized by a source of electric power, a piezoelectric receiving transducer also enclosed in a shielded compartment positioned on the other side of the sensing chamber and in alignment with the transmitting transducer for receiving sound energy through a data hole in the card and transforming said energy into electrical power, a translating circuit connected to the receiving transducer for supplying a signal to a load circuit when a data hole is sensed, and switching means in series with the receiving transducer for disabling the transformation of any received sound energy into electrical power except at the time when the data card is in a predetermined sensing position.

WILLIAM F. CRONIN.

No references cited.